Patented May 2, 1933

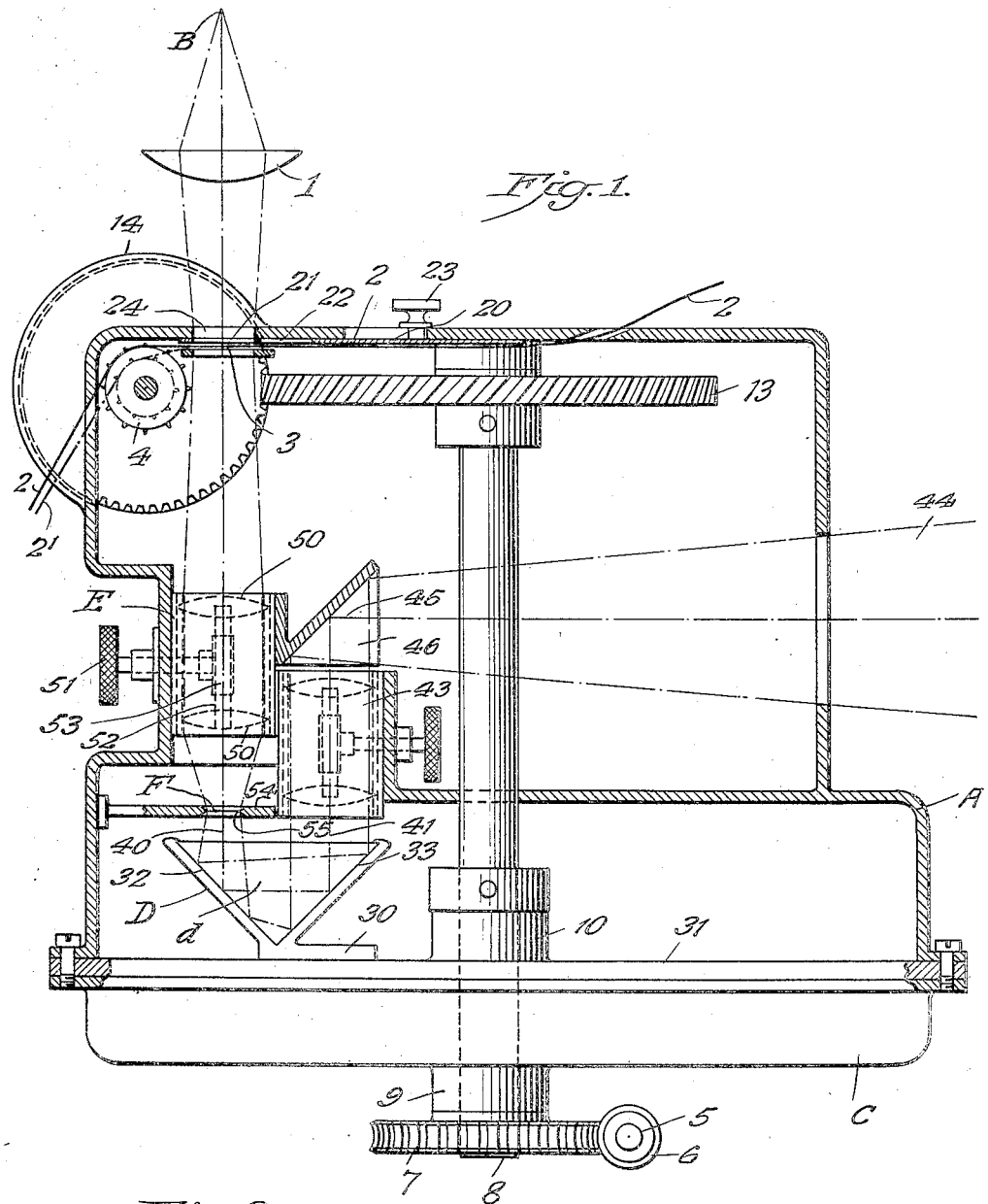

1,906,759

UNITED STATES PATENT OFFICE

WILHO A. KOSKEN, OF NEW YORK, N. Y., ASSIGNOR TO WILHO A. KOSKEN, INC., A CORPORATION OF NEW YORK

MEANS FOR PROJECTING PICTURE FILMS

Application filed October 30, 1929, Serial No. 403,490. Renewed July 30, 1932.

This invention relates to motion picture projectors and more particularly to the continuous moving film type in which no shutters are employed and in which the continuous linear movement of the images carried by the film is compensated in the projection by compensating deflector means. Such compensating deflector means in any one embodiment is capable of compensating for only one linear rate of image travel.

The object of the present invention is to project motion pictures in a machine of this character from a film of a size and bearing images of a size and travelling at a linear rate of speed not necessarily in accordance with the compensating power of the compensating deflector means.

In carrying out this object, it is purposed to produce a travelling secondary image from the travelling film image to cooperate with the compensating deflector means and itself the secondary image to possess the qualities as to size and rate of linear travel to permit the compensating deflector means to function.

Stated differently, it is an object of the present invention to project motion pictures from any one of various sizes of films travelling continuously through the medium of a single compensating deflector mechanism and by means of the expedient of the optical production of a secondary image so that said secondary image may be and is of the predetermined size and travel for which the compensating deflector means is adapted.

Other objects of the invention are in general to improve motion picture projectors and to provide for the projection of motion pictures in a direction not necessarily at right angles to the film bearing the images but in a direction substantially parallel with or at an acute angle to the plane of the motion picture film portion being projected.

The above and further objects of the invention will be pointed out more particularly in the accompanying claims which are directed to an illustrative embodiment of the invention solely for purposes of illustration and not limitation. This illustrative embodiment of the invention is described in the following specification in connection with the accompanying drawing which forms a part hereof and in which like characters designate corresponding parts in the figures.

In the drawing, Fig. 1 is a vertical section with parts in elevation somewhat diagrammatically illustrating the invention; and Fig. 2 is a detail view at right angles to that shown in Fig. 1 of the driving sprockets for two sizes of film.

Referring to the drawing, any suitable casing A serves to house the mechanism and is preferably of cast metal. Any suitable source of projection light B is employed which preferably functions through a condenser lens or lens system 1 to project a beam of light preferably at right angles through the portion of the film 2 at the film gate 3, it being understood that the film 2 carries the usual series of progressive images, but in this machine need not be of one size. The machine is shown threaded with the largest size film and image for which it is adapted although a smaller size is indicated in its position relatively to the film driving sprockets 4 and 4'.

A power or drive shaft 5 is provided for the moving parts and is conveniently fitted with a worm 6 driving the worm wheel 7 which in turn drives the main shaft 8 for the apparatus. The shaft 8 is shown journaled in the bearings 9 and 10 formed as a part of the sub-housing C containing the mechanical movements and mechanism for operating a series of compensating deflectors, one of which is indicated by the character D. It is to be understood that these deflectors D are suitably driven and constrained to travel in such a way as to compensate for the predetermined linear travel of the images for which this machine is designed. The mechanism effecting this compensating movement forms specifically no part of this application but is claimed in my copending application. In fact, it is conceivable that such mechanism might be of a design other than my own.

The drive shaft 8 is extended upwardly through the apparatus and is fitted at its upper end with a spiral gear 13 meshing with the spiral gear 14 on sprocket shaft 15 which drives the sprockets 4 and 4', 4 for the large sized film and 4' for the smaller sized film 2'. The gearing and the size of the sprocket wheels is preferably such, in combination with the image size and its spacing on the films, to effect the same image per second rate of travel for all sizes of film although the images themselves vary in size between the respective films.

In addition to the film gate 3 it is preferable to provide a slide window frame 20 provided with a plurality of windows 21 and 22, each to accord substantially with the size of film to be illuminated by the beam from the source B. This window frame is easily manipulated into position by the thumb screw 23 which also serves to fix its adjustment across the light aperture 24 in the casing A.

Although as I have previously pointed out, the mechanism for operating the compensating deflectors D forms no part of the present invention, it is to be understood that in the present showing the feet 30 carrying these deflectors are guided to move in parallelism with the surface 31 of the sub-housing C and may be the bounding surface of the guiding camway therefor. In the present embodiment each deflector D comprises a prism $d$ having relatively large reflecting surfaces 32 and 33 at right angles to each other and each forming an angle of 45° with the plane 31 and the plane of the film. These prisms extend for a considerable extent vertically of the plane of Fig. 1 and by proper guiding and in proper numbers may effect substantially continuous projection.

In the functioning of the compensating deflector means D, the image being projected is twice reflected, once from the vertical axis 40 horizontally across from the reflecting surface 32 to the reflecting surface 33 and then vertically upward with the vertical axis 41 to suitable lenses of the lens barrel 43 which is adjustable to sharpen the image which is then reflected outwardly into the projection beam 44 by the reflector 45 shown in the form of a prism 46.

In accordance with the present invention, instead of projecting the image from one of the films 2 or 2' directly into the deflector means D, a focusing lens system is interposed between the film gate 3 and the deflector mechanism. This is indicated by the adjustable lens barrel E fitted with suitable lenses 50 and adjustable by any suitable mechanism such as the thumb screw 51 working the rack and pinion 52 and 53 so as to produce optically a secondary image F in cooperative relation and preferably close above the path of the deflectors D. To sharpen the outline of this secondary image F it is preferable to provide a diaphragm 54 provided with the image opening 55. By means of the optical mechanism E a film image of any size within the range of the apparatus may be transformed into a secondary image F, the linear travel of which accords with the compensating capacity of the deflectors D. It is thus contemplated that a large image may be reduced in dimensions for the secondary image and a small image increased in dimensions for the secondary image or that the secondary image may correspond in dimensions with the primary film image. The invention, however, makes it possible in the same apparatus to employ a single compensating deflector mechanism through the intermediary of a predetermined dimension of secondary image regardless of the size of the primary film image from which it is derived.

Although I have shown mechanism for driving but two sizes of film through my machine, it is of course to be understood that any of the usual mechanism embodying variations in sprocket diameter and gearing are contemplated as may be necessary to accord this machine to operation with as many sizes of film as may be desired. They need not have a common axis.

What I claim and desire to secure by United States Letters Patent is:

1. In a projecting machine for a film having a series of images to be projected; a film gate; means for moving a film continuously across said film gate; deflector means for compensating the projection light beam against the continuous travel of said film; means for directing projection light through said film gate; optical means between said film gate and said deflector means for producing a secondary image from said film image in a fixed plane and of a predetermined size regardless of the size of a film image; and means for projecting said secondary image through the cooperation of said deflector means.

2. The machine as described in claim 1 and further characterized by the fact that a plurality of film driving sprockets are provided of different sizes to accord each with a particular size of film and film image and that the mechanical connection for driving said sprockets commensurately with said compensating means accords with the various sizes of film and images thereon.

3. In combination in a projecting machine, compensating deflector means tending in projecting images, to compensate against a predetermined continuous linear travel of image to be projected; means for feeding through said projecting machine any one of a plurality of films bearing images respectively of different linear extent at the same number of images per second relatively to the operation of said compensating deflector means; a source of projection light and optical means for producing from whichever film is being employed in said machine a secondary traveling image of said predetermined size for cooperation with said compensating deflector means instead of a primary image from one of said films.

4. In a continuously moving film projecting machine, compensating deflector means tending to compensate against a predetermined continuous linear rate for a moving image; a source of projection light and optical means for transforming any one of a plurality of moving film images moving at different linear rates into a secondary image moving at said predetermined rate and in cooperative relation to said deflector means.

5. In a motion picture projecting machine, means for causing the traverse through said machine of any one of a plurality of films provided each with a series of images of the same size; a power shaft; compensating deflector means; mechanical movement means connecting said compensating deflector means with said drive shaft to compensate against the movement of an image at a predetermined linear rate of travel; sprockets for said respective films geared to said drive shaft in such a way that the image per second rate of linear travel for said films is the same regardless of the sizes of the images on said films; and optical means for producing from the images on said films secondary images travelling linearly at the predetermined compensation rate for said compensating deflector means.

6. In a motion picture projecting machine, a drive shaft; a film gate; means mechanically connected with said drive shaft for moving a film continuously across said film gate; compensating deflector means constrained to travel in a plane parallel to the plane of film at said film gate and tending to compensate against a predetermined linear rate of image travel; and optical means for changing the film images carried by said film into the form of secondary images reproduced in cooperative relation to said deflector means.

WILHO A. KOSKEN.